Jan. 31, 1956  G. A. DEL VALLE ET AL  2,733,062
SPROCKET SHOE FOR FILM HANDLING APPARATUS
Filed Dec. 22, 1952

INVENTORS.
Guillermo A. Del Valle
& Alan S. Jones
BY

ATTORNEY.

United States Patent Office 2,733,062
Patented Jan. 31, 1956

2,733,062

SPROCKET SHOE FOR FILM HANDLING APPARATUS

Guillermo A. del Valle, Merchantville, and Alan S. Jones, Pitman, N. J., assignors to Radio Corporation of America, a corporation of Delaware Application December 22, 1952, Serial No. 327,316

7 Claims. (Cl. 271—2.3)

This invention relates to motion picture equipment, and particularly to a skid or shoe for guiding sound motion picture film to and from a sprocket or roller.

It is well-known that toothed sprockets or rollers are used for advancing motion picture film through cameras, projectors, sound recorders, and reproducers, and that either pad rollers or shoes are used for maintaining the film on the sprocket. A film shoe of the general type disclosed hereinafter is shown in del Valle U. S. Patent No. 2,608,406 of August 26, 1952, the present invention retaining the many advantages of the shoe of that patent, while providing additional advantages. For instance, the improved shoe of the instant invention has greater simplicity of adjustment in relation to a film sprocket or roller. It also facilitates the removal of foreign matter from the surface of the shoe, and it is so arranged that the film may be quickly threaded therein, while preventing axial variation. Simple adjustments are provided for aligning the shoe assembly both axially or rotatably with respect to the axis of the sprocket or roller with which it is used.

The principal object of the invention, therefore, is to provide an improved shoe assembly which will facilitate the threading, guiding, and maintaining of film on a film drive sprocket or roller.

Another object of the invention is to provide an improved film guide shoe which is simple in construction and highly efficient in use.

A further object of the invention is to provide an improved mounting for a film guide shoe which is simple to adjust.

A still further object of the invention is to provide an improved flexible mounting for a film guide shoe.

The novel features which are believed to be characteristic of this invention, both as to its organization and the mode of its operation, as well as additional objects and advantages thereof, will be better understood from the following description, when read in conjunction with the accompanying drawings, forming a part hereof, in which.

Figure 1:
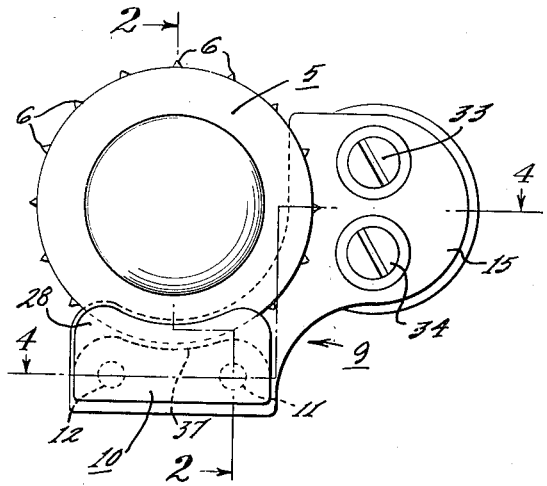
Fig. 1 is a front, elevational view of a film shoe assembly embodying the invention.
Figure 2:
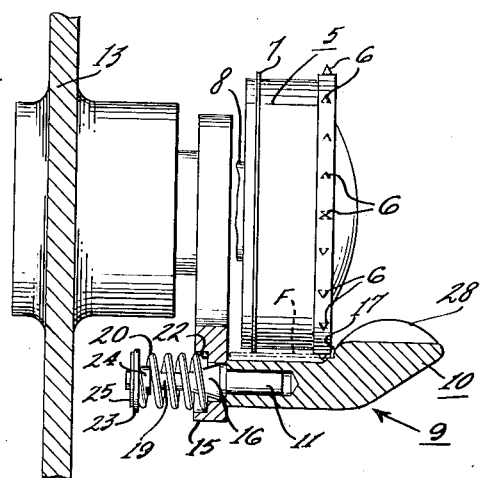
Fig. 2 is a cross-sectional view of the assembly shown in Fig. 1 and taken along the line 2—2 of Fig. 1.

Referring more particularly to the drawings, in which the same numerals identify like elements, a sprocket 5 of the type generally used for sixteen millimeter film (Fig. 2) has a single row of teeth 6 and a flange 7. The sprocket 8 is mounted for rotation with a shaft 8 shown broken for purposes of clarity, the shaft being journaled in a panel 13 in any suitable manner. The shoe assembly 9 comprises an upwardly, concavely curved or dished sprocket shoe 10 having a film guiding shoulder 17 and an upturned tip portion 28. The shoe is mounted on a pair of pins 11 and 12 which are pressed into holes in the shoe 10, the pin 12 having a tapered end 14, while the pin 11 extends through and beyond a mounting plate 15 and has a tapered center portion 16. The shoulder 17 is disposed in front of the sprocket 5 to facilitate insertion of the film edgewise between the sprocket 5 and the shoe 10 even without touching the shoe 10 by the hand. The curved portion 37 of the shoe has a curvature concentric with the curvature of the sprocket surface. Surrounding the extending section 19 of the pin 11 is a coil spring 20, one end of which abuts a shoulder 22 in the mounting plate 15, and the other end of which abuts a bushing 23, which centers the spring by a collar portion 24. A spring washer 25 maintains the bushing 23 in position.

Figure 5:
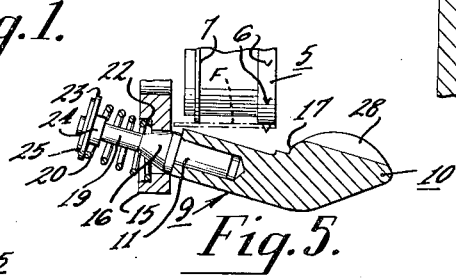
Fig. 5 is a detail view, partly in section, showing the shoe tilted for threading.

The above mounting of the shoe 10 on the plate 15 permits the end 28 to be tilted away from the sprocket, as shown in Fig. 5, the tapered sections 14 and 16 permitting this tilting action. This flexible mounting permits a defective portion of a film passing over the sprocket 5 to go through betweeen the shoe and sprocket without further damage to the film. Also, by the use of the two pins 11 and 12, the shoe 10 is prevented from rocking axially, and, therefore, prevented from contacting the periphery of the sprocket when the machine is run without film threaded through it.

Figure 3:
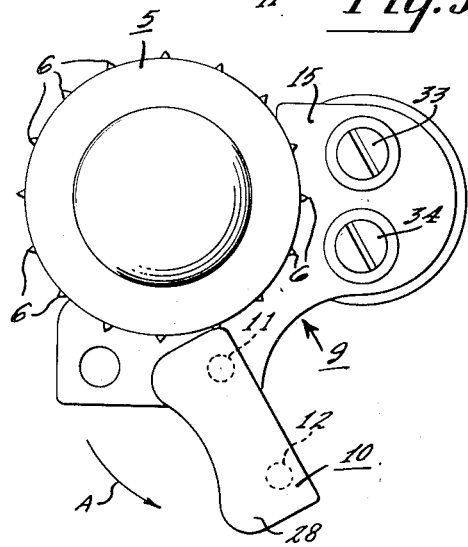
Fig. 3 is a front, elevational view showing the shoe rotated with respect to its operating position.
Figure 4:
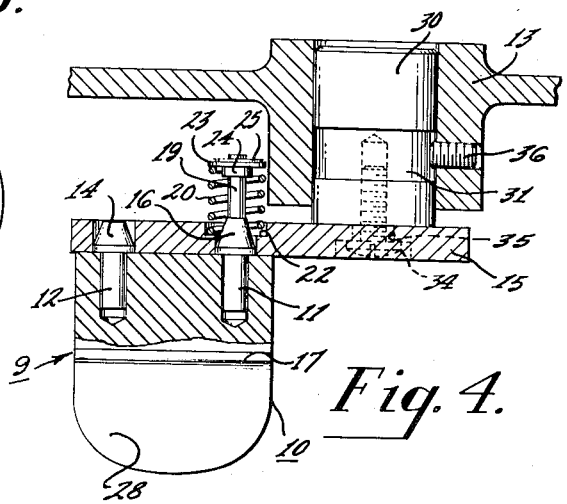
Fig. 4 is a cross-sectional view taken along the line 4—4 of Fig. 1.

To facilitate the cleaning of the shoe, which consists in the removal of foreign matter from the surface of the shoe, it is only necesary to pull the shoe away from the mounting plate 15 until the pin 12 becomes disengaged from its hole. The shoe may then be rotated on the pin 11 in the direction of the arrow A, as shown in Fig. 3, to make it accessible for easy cleaning.

Another feature of the present invention is its simplicity of adjustment in relation to the sprocket 5. This is provided by having the mounting plate 15 attached to a sliding stud 30, having a recessed portion 31, by a pair of screws 33 and 34, which are positioned in oversized holes 35. The stud 30 is in a hole in a boss of the panel 13, the shaft 8 of sprocket 5 being forward of the boss as viewed in Fig. 2. To correctly position the shoe, the screws 33 and 34 are loosened and a double piece of film or a strip of equivalent thickness is inserted between the sprocket 5 and the shoe 10. The shoe is then pressed against the sprocket and the screws 33 and 34 are tightened in position. The axial alignment of the shoe in relation to the sprocket is obtained by loosening a set screw 36 passing through the frame 13, and sliding the stud 30 axially to the proper position, the set screw 36 then being tightened.

We claim:

1. A film shoe assembly adapted to maintain a film in contact with a sprocket comprising, in combination, a sprocket adapted to advance film thereover, means for mounting said sprocket for rotation, a film shoe having a concave film contacting surface which has a curvature concentric with the film engaging surface of said sprocket, and means connected to said sprocket mounting means for mounting said shoe with its concave surface adjacent the film engaging surface of said sprocket, one end of said shoe extending beyond the end of said sprocket and toward the axis of said sprocket, said shoe mounting means including a pair of pins fixedly mounted in the other end of said shoe, a mounting plate having holes in which said pins are positioned and movable, one of said pins extending through and beyond said plate, means for resiliently mounting said one pin to said plate, and means for adjusting said shoe axially with respect to the end of said sprocket and radially with respect to the axis of said sprocket.

2. A film shoe assembly in accordance with claim 1 in which the portions of said pins in said holes in said plate are convergingly tapered away from said shoe to permit movement of the extending end of said shoe away from the axis of said sprocket while said pins remain in said holes.

3. A film shoe assembly in accordance with claim 1 in which said resilient mounting means includes a coil spring surrounding the portion of said one pin extending beyond said plate and a bushing on the end of said extended portion, the ends of said spring abutting said plate and said bushing.

4. A film shoe assembly in accordance with claim 1 in which said last-mentioned means is a stud attached to said plate and having an axis parallel with the axis of said sprocket and movable axially in said shoe mounting means, and screws for adjustably fastening said plate to said stud.

5. A film shoe assembly having a shoe for maintaining a film on a sprocket comprising a shoe having a concave surface facing the convex surface of said sprocket, a frame, a mounting plate perpendicular to the axis of said sprocket, means for mounting said plate to said frame, means for mounting said shoe to said plate, said last mentioned means including a pair of pins fixedly attached to said shoe and movably positioned in holes in said plate to prevent rotation of said shoe with respect to said sprocket, one of said pins having a portion thereof extending beyond said plate, and resilient means on said one pin for urging said shoe toward said plate, said resilient means permitting sufficient axial movement of said shoe to remove said other pin from its hole in said plate to permit rotation of said shoe on said one pin.

6. A film shoe assembly in accordance with claim 5 in which the portion of each of said pins in said holes is convergingly tapered away from said shoe to permit tilting of said shoe with respect to said sprocket when said pins are in said holes.

7. A film shoe assembly in accordance with claim 6 in which said first mentioned mounting means is an axially adjustable stud in said frame and screws for holding said plate on said stud.

References Cited in the file of this patent
UNITED STATES PATENTS

| | | |
|---|---|---|
| 1,857,116 | Dina | May 3, 1932 |
| 1,957,164 | Frappier et al. | May 1, 1934 |
| 2,422,310 | Nemeth | June 17, 1947 |
| 2,455,051 | Fairbanks | Nov. 30, 1948 |
| 2,530,448 | Boecking | Nov. 21, 1950 |
| 2,541,475 | Lyman et al. | Feb. 31, 1951 |
| 2,552,299 | Thevenaz | May 8, 1951 |
| 2,608,406 | Del Valle | Aug. 26, 1952 |
| 2,674,454 | Mennecke | Apr. 6, 1954 |